United States Patent [19]
Baldinger

[11] Patent Number: 5,299,362
[45] Date of Patent: Apr. 5, 1994

[54] METHOD OF, AND APPARATUS FOR, HEAT TREATING A MATERIAL WEB PROVIDED WITH A LIQUID OR PASTE-LIKE PREPARATION

[75] Inventor: Hansjorg Baldinger, Niederlenz, Switzerland

[73] Assignee: Van Brandwijk Systems Programming B. V., Gravenhage, Netherlands

[21] Appl. No.: 685,407

[22] Filed: Apr. 16, 1991

[30] Foreign Application Priority Data

Apr. 18, 1990 [CH] Switzerland .................. 01314/90

[51] Int. Cl.⁵ .............................................. F26B 3/28
[52] U.S. Cl. ................................... 34/4; 34/18; 34/41; 34/156; 34/68; 118/643
[58] Field of Search .................. 34/155, 156, 17, 18, 34/60, 68, 39–41, 4; 226/7, 97; 118/642, 643

[56] References Cited

U.S. PATENT DOCUMENTS

| | | |
|---|---|---|
| 2,532,032 | 11/1950 | Offen . |
| 3,235,931 | 2/1966 | Brückner ............................ 34/41 |
| 3,460,265 | 8/1969 | Smith, Jr. ......................... 34/1 X |
| 3,793,741 | 2/1974 | Smith, Jr. ........................... 34/54 |
| 4,127,945 | 12/1978 | Nöthen et al. .................... 34/60 |
| 4,336,279 | 6/1982 | Metzger ............................ 34/4 |
| 4,359,826 | 11/1982 | Rounsley .......................... 34/18 |
| 4,674,197 | 6/1987 | Fleissner .......................... 34/68 |
| 4,674,976 | 6/1987 | Naohara et al. .................. 34/156 |
| 4,756,091 | 7/1988 | Van Denend ..................... 34/68 |
| 4,918,828 | 4/1990 | Ruottu et al. ...................... 34/4 |
| 4,936,025 | 6/1990 | Heikkilä ............................ 34/41 |
| 4,942,674 | 7/1990 | Karlsson .......................... 34/41 |
| 5,009,016 | 4/1991 | LePisto et al. .................... 34/41 |

FOREIGN PATENT DOCUMENTS

| | | |
|---|---|---|
| 157403 | 9/1985 | European Pat. Off. . |
| 346081 | 12/1989 | European Pat. Off. . |
| 2502367 | 12/1975 | Fed. Rep. of Germany . |
| 3209475 | 9/1983 | Fed. Rep. of Germany . |
| 3834058 | 5/1989 | Fed. Rep. of Germany . |
| 2630532 | 10/1989 | France . |
| WO89/04890 | 1/1989 | World Int. Prop. O. . |

Primary Examiner—Henry A. Bennet
Assistant Examiner—Denise L. Gromada
Attorney, Agent, or Firm—Keck, Mahin & Cate

[57] ABSTRACT

Prepregs are fabricated in a substantially horizontal treatment chamber by heat treating a material web impregnated with a thermosetting resin. In this treatment chamber, the material web is subjected to blowing directed toward the material web and held thereby in suspension. The blowing air heats the material web and dilutes and conveys away solvent vapors. Alternately with zones of blowing directed toward the material web, there are arranged radiant-heating zones.

30 Claims, 3 Drawing Sheets

METHOD OF, AND APPARATUS FOR, HEAT TREATING A MATERIAL WEB PROVIDED WITH A LIQUID OR PASTE-LIKE PREPARATION

BACKGROUND OF THE INVENTION

The present invention broadly relates to the thermal treatment of material webs in drying machines, float driers and similar installations and, more specifically, pertains to a new and improved method of heat treating a material web provided with a liquid or paste-like preparation. The present invention also relates to a new and improved apparatus for heat treating a material web selectively provided with a liquid or paste-like preparation.

Generally speaking, the method of heat treating a material web provided with a liquid or paste-like preparation is of the type according to which the material web is heat treated in at least one treatment chamber by means of thermal or heat radiation and hot air.

Such a method and such an apparatus are known from and disclosed in, for example, British Patent No. 1,234,956, published Jun. 9, 1971. According to this prior art construction, a material web provided with a liquid treating medium applied thereon is treated in a treatment chamber by means of thermal radiation and hot air. The treatment chamber is arranged in a vertical drying housing. The paper web travels along an inverted U-shaped path and assumes an inverted U-shaped configuration with upwardly and downwardly traveling spans. Preheated air is guided along the paper web in counter-current flow thereto and laterally blown in. In the treatment chamber there are applied or mounted at both sides of the material web a plurality of heating pipes, through which hot steam flows.

A method of drying and cross linking polymers applied on substantially flat articles or products is known from and disclosed in, for example, East German Patent No. 212,574, granted Aug. 15, 1984. This state-of-the-art method serves for drying and partial cross linkage of base materials or stock impregnated with polymer fixing agents for prepreg fabrication. An air flow or current runs through the drier. In order to use the infed or supplied thermal or heat energy largely only for solvent volatilization as well as for further heating of the prepreg web, thus achieving essential energy savings, the air flow or current entering the drier at an inlet slot is divided into a main airflow and a substantially smaller or lesser airflow. The main airflow is unheated and conducted through an outer drier chamber. The other substantially smaller airflow enters an inner drier chamber and is therein heated up by heating plates. The heating plates serve hence to heat the airflow.

The material web to be heat treated is particularly an impregnated web, for instance a prepreg. A prepreg is a substantially flat product provided with a thermosetting or settable resin, upon which the synthetic resin applied thereon in the form of a solution or dispersion is cured to a certain degree by a chemical reaction. The properties and characteristics of a prepreg with respect to its application or use are determined by the curing stage, so that the curing reaction has to be very carefully and accurately controlled and effected to the desired degree of curing. Particularly, there is desired a constant quality and therewith a constant degree of curing over the entire substantially flat product.

Paper prepregs are fabricated according to the state-of-the-art in so-called float or suspension driers or furnaces. Such installations are substantially horizontal treatment or treating chambers, within which the impregnated paper web is subjected to blowing by means of hot air directed toward the web and floatingly guided through the treatment chamber. The floating or hovering effect can be achieved either by the airfoil principle or by the air cushion principle. Both principles or systems utilize the turbulences occurring at the high velocity or flow rate of the air. The material web is thereby acted upon or impinged with air from above and from below by means of air-nozzle arrangements, this rendering possible a steady or smooth guidance in a floating state or condition also at high material-web velocities. It is essential that the material web does not flutter and does not bound or strike against the air nozzles.

Apart from the floating transport or conveyance of the material web, the introduced or insufflated air also serves to dry the material web, i.e. to blow out volatile matter or components, for instance light solvent or water, to dilute and conduct away such matter or components, and to impinge or furnish the material web with heat, i.e. to bring about the curing reaction.

Respective hitherto known float or suspension driers or furnaces are being built for some years past and used for fabricating prepregs. However, it is true that prepregs fabricated in the heretofore conventional manner no longer meet the ever increasing requirements of present-day electronics industry. Particularly, objection is made with regard to the non-uniformity of the cure over the surface.

A uniform temperature in the airflow can be of course achieved over the width of the treatment chamber, independent of whether the nozzles are supplied from one side, from both sides or from the middle. However, since the degree of curing is not only dependent on the temperature, but also upon the velocity or flow rate of the air with which heat is applied or furnished to the material web, the main problem is the generation of a uniform outblowing or air-ejecting velocity. This is not sufficiently controllable at air velocities of 8 m/sec to 40 m/sec, particularly in wide installations. If, for example, in the presence of a material web having a width of 3 m, the air velocity varies by +/−3%, the therefrom resulting variation in the degree of curing of the prepreg is no longer acceptable. Accordingly, the heretofore known float or suspension driers are very much limited with respect to their operational use as well as application.

SUMMARY OF THE INVENTION

Therefore, with the foregoing in mind, it is a primary object of the present invention to provide a new and improved method of, and apparatus for, heat treating a material web provided with a liquid or paste-like preparation, which method and apparatus do not exhibit the aforementioned drawbacks, limitations and shortcomings of the prior art.

Another and more specific object of the present invention aims at providing a new and improved method of and apparatus for heat treating a material web provided with a liquid or paste-like preparation, by means of which there is accomplished, in the presence of preferably substantially horizontal material-web guidance, but also in the case of substantially vertical material-web guidance by means of air-blowing, a qualitatively excellent and, particularly with respect to the so-called flow profile for the electronics industry, sufficiently uniform cure of the material web, especially of the prepreg.

The measurement of the flow profile represents a generally known method or process of measuring the degree of curing. Under 'uniform flow profile' there is here understood a tolerance of +/−1% in the case of a 15 per cent cure, thus a cure of 14% to 16%.

In keeping with the immediately preceding object, it is a further object of the present invention to provide a new and improved method of, and apparatus for, heat treating a material web selectively provided with a liquid or paste-like preparation, by means of which the thermal treatment can serve to dry the material web, to dry and cure the material web or prepreg web, and to simply cure the resin, for example, in the case of melt resin application. Under the term 'cure' there is to be understood a chemical reaction, so for instance a prepolymerization in the case of epoxy resins or a prepolycondensation in the case of phenolic resins. A total cure can also take place, by way of example, in the case of acrylic resins.

Yet a further significant object of the present invention is concerned with a new and improved method of heat treating a material web provided with a liquid or paste-like preparation, which is applicable for heat treating not only paper prepregs impregnated with resin, but also other material webs which can be coated on one web side or on both web sides. Such other material webs can be, for example, fleeces, fabrics, metal sheets such as steel and aluminum, and plastic sheets and foils with high-temperature stability. The materials applied to the material web can be, for instance, acrylic polymers, polyvinyl chloride PVC, polyurethane PUR, melamine resins, epoxy resins etc. The product can be then a coated, enamelled or imprinted metal sheet or plastic foil, a decorative material, flooring material, imitation leather or leather cloth, or upgraded paper.

Now in order to implement these and still further objects of the invention which will become more readily apparent as the description proceeds, the method of heat treating a material web provided with a liquid or paste-like preparation is manifested by the steps of impinging the material web by means of radiant heat in at least one predetermined zone and subjecting the material web to blowing with preheated air directed toward the material web in at least one other predetermined zone.

The features of the inventive method of heat treating a material web are based on the findings that by rendering non-uniform, especially by strongly rendering non-uniform the subjection of the material web to blowing, namely by interrupting the air infeed or supply over preferably long lengths or zones, in that—in the aforesaid at least one predetermined zone—the material web is impinged by means of radiant heat and thus not subjected to blowing with preheated air, neither the conveyance of the material web nor the quality, i.e. the uniformity, of the cure is impaired. Quite on the contrary, there is achieved—beyond all expectation—a uniformity or evenness of the curing reaction and therefore of the degree of curing.

As alluded to above, the invention is not only concerned with the aforementioned method aspects of heat treating a material web, but also relates to a novel construction of an apparatus for heat treating a material web selectively provided with a liquid or paste-like preparation.

Generally speaking, the apparatus constructed according to the invention and serving to carry out the inventive method comprises a treatment chamber through which a material web is conducted and within which there are arranged at least one radiant heater and at least one air inlet or intake for hot air.

In order to implement the aforementioned and still further objects of the invention, which will become more apparent as the description proceeds, the apparatus of the present invention is manifested, among other things, by the features that in the treatment chamber there are consecutively arranged, in the predetermined direction of travel of the material web, at least one radiant heater and at least one air nozzle.

The material web is preferably substantially horizontally guided or conducted through the at least one treatment or treating chamber.

It is advantageous when the material web in the at least one treatment or treating chamber is held in suspension by subjecting the material web to blowing with preheated air directed toward the latter. Therefore, essentially the known method from heretofore known float or suspension driers is performed. An apparatus to carry out the method of the present invention can be fabricated in a simple manner in that one or several air nozzles are removed from an existing suspension drier or furnace and that heat radiators are mounted in place of the removed one or several air nozzles.

It is furthermore advantageous that the material web in the at least one treatment chamber is, in the first instance, subjected to blowing directed toward the web and, thereupon, impinged with radiant heat. However, it is also feasible that, according to a variant method step, the material web in the at least one treatment chamber is first impinged with radiant heat and thereafter subjected to blowing directed toward the web.

It is particularly advantageous when the material web in the at least one treatment chamber is alternately subjected to blowing with preheated air directed toward the web and impinged with radiant heat The material web in the same one blowing zone in the treatment chamber can be advantageously subjected to blowing with preheated air alternately from the lower web side and from the upper web side.

If the material web is one-sidedly impinged with radiant heat, then the retrofitting or backfitting of a known or existing suspension drier is possible in a particularly simple manner. It must be namely possible to introduce or infeed the material web through the entire apparatus or installation. In the case of radiant heaters being provided at both sides or faces of the material web, it is advantageous to structure at least one of the radiant heaters to be movable or displaceable. Upon infeeding the material web, such movable radiant heater is moved away such that the distance between the two radiant heaters is increased, thus allowing the material web to be readily introduced into the respective heating zone. During operation, this distance or spacing is again reduced in size. In the case of retrofitting an existing radiation drier, it is relatively complicated and difficult to mount or install a movable or displaceable radiator. In such a case, it would be advantageous to only provide one radiant heater, so that the aforementioned problem of infeeding the material web does not arise at all.

According to a further advantageous development of the invention, the material web in the at least one treatment chamber is impinged with radiant heat from above and from below. In other words, the apparatus is provided with radiant heaters at both sides or faces of the material web. Preferably, at least one of these two radiant heaters is structured to be movable, such construction being suitable for newly built installations. Radiation from both sides or faces of the material web doubles radiant heating, thus improving the efficiency and performance of the apparatus.

The material web is advantageously heated over the width thereof with radiant heat of different temperature, preferably with radiant heat of three different temperatures. The radiant heaters of the apparatus constructed according to the invention thus comprise each, transversely relative to the direction of web travel, several, preferably three zones, the temperature of which is controllable independently of one another.

In that the radiant heaters are subdivided over the width of the treatment chamber into single, individually controllable zones, i.e. that the material web over its width is impinged by radiant heaters with different quantities of radiant heat, the uniformity of the curing reaction and thus of the degree of curing can be further increased and enhanced. Experience thus far has shown that subdivision or breakdown in three different temperature zones is adequate up to a material-web width of 1.3 m to 2.0 m. It can be advantageous to provide four or more temperature zones for a material-web width exceeding 2.0 m. The more temperature zones are provided, the better the heat supply is controllable over the width of the material web. On the other hand, such installation will require a corresponding constructional expenditure.

It is advantageous when the radiation temperature is higher, preferably at least 15° C. higher, than the hot air temperature. In order to be able to maintain this higher temperature, it is favorable when the radiant heater possesses a heat storing capacity. This cannot be achieved with normal electric radiators, but more so with heating plates, preferably metal plates, having a substantial heat storing capacity. These plates can comprise, for example, at their side remote from the material web, tubes or coils for throughflow or passage of oil, water, steam or any other suitable liquid or fluid. A heating of such plates by means of electric energy is also conceivable.

A further exemplary embodiment of the apparatus constructed according to the invention is characterized in that the radiant heater possesses a surface facing or confronting the material web, such surface being substantially even and smooth.

A further advantage of the present invention is seen in the fact that paradoxically a higher performance is achieved when less suspension nozzles are used. Moreover, the maintenance of the apparatus or installation is simpler and more economical inasmuch as suspension nozzles are soiled by impregnating resin and have to be periodically cleaned, while the radiant heaters preferably possessing a smooth surface do not show soiling or dirt accumulation.

In contrast to prior art float or suspension driers being used only for fabricating prepregs on the basis of paper, the apparatus constructed according to the invention is also suitable for fabricating prepregs basing on fleeces and fabrics, and for treating other material webs provided with a liquid preparation, for example, coated or imprinted metal sheets and impregnated or coated paper webs.

The apparatus is suitable for fabricating finished products as well as for fabricating semifinished products.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have been generally used the same reference characters to denote the same or analogous components and wherein.

DETAILED DESCRIPTION OF THE PREFERRED EMBODIMENTS

Describing now the drawings, it is to be understood that to simplify the showing thereof, only enough of the construction of the exemplary embodiment of the apparatus for heat treating a material web provided with a liquid or paste-like preparation has been illustrated therein as is needed to enable a person skilled in the art to readily understand the underlying principles and concepts of this invention.

Figure 1:
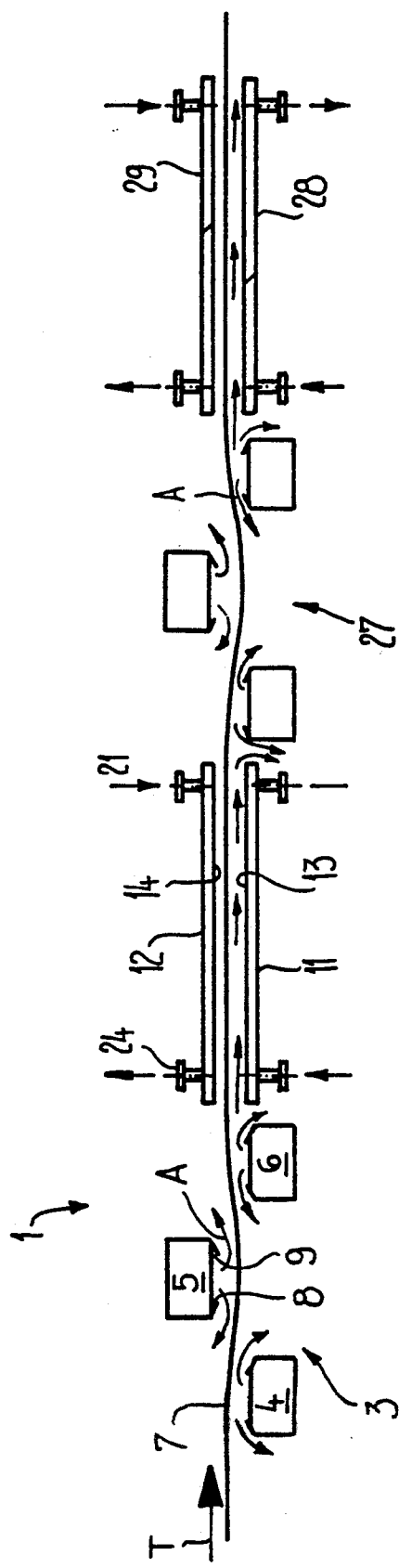
FIG. 1 schematically shows in a side view a relative arrangement of the essential elements provided in an apparatus constructed according to the invention.
Figure 2:
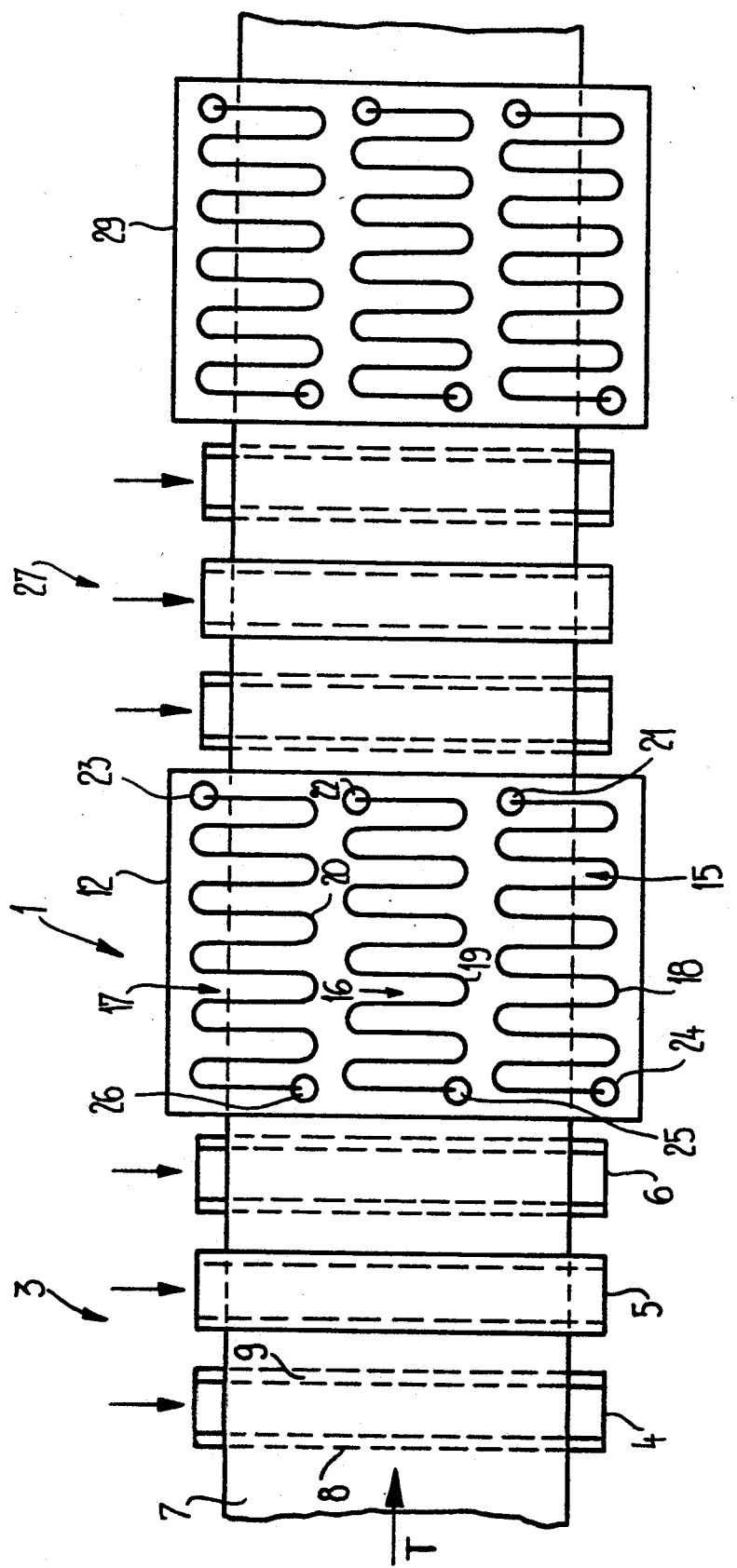
FIG. 2 schematically shows in a top plan view the relative arrangement of the essential elements provided in the apparatus according to FIG. 1.
Figure 3:
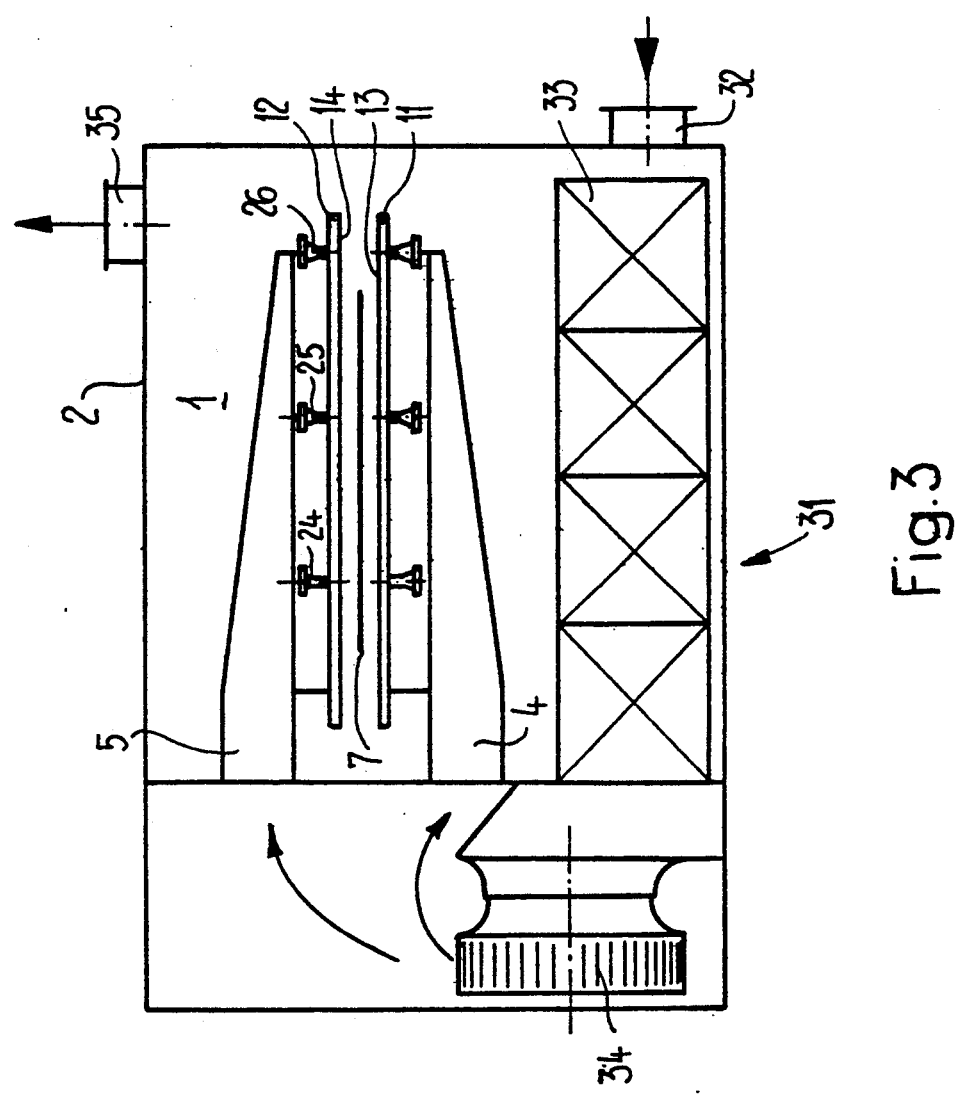
FIG. 3 schematically shows a section taken substantially through an apparatus constructed according to the invention, the section being substantially transverse with respect to the direction of travel or conveyance of the material web.

Turning attention now to FIGS. 1 and 2 of the drawings, the apparatus illustrated therein by way of example and not limitation will be seen to comprise a treatment chamber or suspension furnace 1, walls 2 of which are shown only in FIG. 3. In this treatment chamber or suspension furnace 1 there are arranged at the inlet or access end thereof a first group 3 of three nozzle casings 4, 5 and 6 of conventional structure, which extend transversely with respect to the direction of travel or conveyance T of a material web 7.

The first nozzle casing 4 located at the inlet or access end is arranged below the material web 7. The second nozzle casing 5 is arranged above the material web 7 and is offset downstream of the first nozzle casing 4 as viewed in the direction of travel or conveyance T of the material web 7. The third nozzle casing 6 is arranged again below the material web 7 and is offset downstream of the second nozzle casing 5 as viewed in the direction of travel or conveyance T of the material web 7.

The nozzle casings 4, 5 and 6 each comprise slit nozzles 8 and 9, which extend transversely with respect to the direction of travel or conveyance T of the material web 7. A blow or blowing jet exits from each of the slit nozzles 8 and 9, whereby the blow jets of each pair of slit nozzles 8 and 9 are directed against each other and toward the material web 7. Both the blow jets of hot air collide and form an air cushion for holding the material web 7 in suspension. The ejected hot air simultaneously heats the material web 7, blows the solvent out of the impregnating resin and conveys away the solvent. The flow direction of the hot air is conveniently illustrated by small arrows A.

The treatment chamber or suspension furnace 1 depicted in FIGS. 1 through 3 of the drawings operates according to the air cushion principle. However, such a float or suspension furnace serving to perform and carry out the inventive method can be also provided with air ejection nozzles operating according to the so-called airfoil principle. This airfoil principle is described, for example, in German Patent No. 3,607,370, published Nov. 5, 1987.

Radiant elements or heaters 11 and 12 with respective smooth and planar radiant heating surfaces 13 and 14 facing or confronting the material web 7 are arranged, viewed with respect to the direction of travel or conveyance T of the material web 7, downstream of the first group 3 of nozzle casings 4, 5 and 6, whereby the radiant element or heater 11 is located below the material web 7 and the radiant element or heater 12 is located above the material web 7. These radiant elements or heaters 11 and 12 are subdivided each in three individual heating zones 15, 16 and 17 extending in the direction of travel or conveyance T of the material web 7, as shown in FIG. 2.

The individual heating zones 15, 16 and 17 comprise respective mutually independent serpentine-shaped heating coils or calorifiers 18, 19 and 20 having respective heating-medium inlets 21, 22 and 23 and respective heating-medium outlets 24, 25 and 26. This arrangement renders possible a requirement-adequate varying heating of the material web 7 over the width thereof and thereby an optimization of the uniformity of the degree of curing over the surface of the material web 7. The heating zones 15, 16 and 17 depicted in FIG. 2 possess the same width. However, the radiant elements or heaters 11 and 12 can be also subdivided in zones of different width, for example, in two wide outer zones and a narrow central zone, or in two narrow outer zones and one wide central zone. On the other hand, the radiant elements or heaters 11 and 12 can be subdivided in only two or in more than three mutually independent controllable zones.

A further group 27 of three nozzle casings provided in analogous arrangement as in the first group 3 is arranged, viewed in the direction of travel or conveyance T of the material web 7, downstream of the two radiant elements or heaters 11 and 12. Two further radiant elements or heaters 28 and 29 follow downstream of the further group 27 of three nozzle casings, whereby the radiant element or heater 28 is arranged below the material web 7 and the radiant element or heater 29 is arranged above the material web 7.

The nozzle casings 4, 5 and 6 are preferably fed or supplied with a mixture of fresh air and circulating air. A respective device 31 is shown in FIG. 3. Fresh air is supplied to a circulating-air fan 34 via a fresh-air inlet 32 and a filter 33 and via a heat exchanger or a direct burner, and mixed with circulating air, the nozzle casings 4, 5 and 6 being supplied with the air mixture, whereby nozzle casing 6 is not visible in FIG. 3. The solvent-laden exhaust air from the interior of the treatment chamber or float or suspension furnace 1 is conducted away through an air outlet or vent 35. The fresh air can be preheated.

A treatment or treating chamber in an apparatus constructed according to the invention can be assembled out of several units of the type depicted in the drawings and being between 2 m and 6 m in length, thus forming an overall furnace having a length of up to 60 m plus.

The nozzle casings and the heating plates can be adjustably arranged with reference to their respective distance to the material web 7.

The material web, carried by the injected air, is guided or conducted in the form of a sinusoid through the float or suspension furnace. The amplitude height of the curve is, on the one hand, dependent on the material web tension or tautness which is set, for instance, by means of a dancer-roll controlled material-web withdrawal and, on the other hand, dependent on the injected air speed or injected air volume. By reducing the tension or tautness of the material web, the amplitude height and thereby the dwell time in the float or suspension furnace is increased.

According to a particular exemplary embodiment of the apparatus constructed according to the invention, the radiant heating surfaces of the radiant elements or heaters are structured to be curved in conformity with the material web conveyed in the treatment or treating chamber. This results in a substantially constant or invariable spacing between the material web and the respective radiant heating surface or surfaces over the entire length thereof and thereby in a further optimation of the uniformity of the cure.

Aside from the nozzle casings 4, 5 and 6 being arranged, as depicted in FIGS. 1 and 2, in a group of three units, such nozzle casings can be also arranged in groups of two units and in groups of up to six units. It is likewise possible to arrange one single nozzle casing between two radiant elements or heaters, viewed in the direction of web travel. When the radiant elements or heaters are arranged at only one side or face of the material web, the aforesaid single nozzle casing can be arranged at the same one side or face or then at the other side or face of the material web. In an arrangement of radiant heaters and nozzle casings being provided above the material web, the air nozzles would operate according to the airfoil principle. Forwardly and rearwardly of a radiant element or heater located at one side or face of the material web, there is advantageously arranged one nozzle casing each at the same one side or face of the material web as the aforesaid radiant element or heater.

The inventive method of heat treating a material web, particularly for the fabrication of prepregs, is suitable for material webs of paper, fleece or fabrics and for the known thermosetting types of resin such as, for example, phenolic, epoxy and melamine resins.

The required individual conditions in the respective apparatus for the type of material in question are dependent on the base material of the material web, the type of resin, the resin application and the desired degree of curing, and such conditions are readily set by one skilled in the art subsequent to preliminary experiments or tests.

Operational outblowing velocities or flow rates are generally between .5 m/sec and 50 m/sec. The air temperature advantageously lies 20° C. to 25° C. below the temperature of the radiant elements or heaters.

The operating or working conditions for fabricating a prepreg according to the inventive method are disclosed hereinbelow by way of example:

| | |
|---|---|
| - material web: | paper 180 g/m² (base paper) |
| - resin: | phenolic resin |
| - resin application weight: | 60% dry |
| - material-web velocity: | 40 m/min |
| - air temperature: | 180° C. |

-continued

| - air velocity: | 20 m/sec |
| - radiant-heat temperature: | 200° C. |

While there are shown and described present preferred embodiments of the invention, it is to be understood that the invention is not limited thereto, but may be otherwise embodied and practiced within the scope of the following claims. ACCORDINGLY,

What is claimed is:

1. A method of heat treating a material web, selectively provided with a liquid having viscosity selected from low viscosity and high viscosity, in a treatment chamber by means of thermal radiation and hot air, comprising the steps of:
   impinging the material web by means of radiant heat a first time in one predetermined zone of said chamber;
   thereafter subjecting the material web to blowing with preheated air directed toward said material web in at least one other predetermined zone of the same chamber thereby holding and guiding the material web by the preheated air floatingly in the form of a sinusoid throughout the treatment chamber; and
   thereafter impinging the material web by means of radiant heat a second time in a further predetermined zone of the same chamber.

2. The method as defined in claim 1, further including the step of:
   guiding the material web substantially horizontally through said at least one treatment chamber.

3. The method as defined in claim 1, wherein:
   said step of impinging the material web in said at least one treatment chamber by means of radiant heat in said one predetermined zone is performed prior to said step of subjecting the material web to blowing with preheated air in said at least one other predetermined zone.

4. The method as defined in claim 1, wherein:
   said step of impinging the material web by means of radiant heat, said step of subjecting the material web to blowing by means of preheated air and said step of impinging the material web by means of radiant heat a second time entail alternately subjecting the material web to blowing with preheated air and impinging the material web with radiant heat.

5. The method as defined in claim 1, wherein:
   said step of subjecting the material web to blowing with preheated air directed toward said material web in said at least one other predetermined zone entails alternately blowing preheated air toward the lower web side and toward the upper web side within the same one of said at least one other predetermined zone.

6. The method as defined in claim 1, wherein:
   said step of impinging the material web by means of radiant heat in said at least one predetermined zone entails impinging the material web with radiant heat at one side of said material web.

7. The method as defined in claim 1, wherein:
   said step of impinging the material web by means of radiant heat in said at least one predetermined zone entails simultaneously impinging the material web from above and from below with radiant heat.

8. The method as defined in claim 1, wherein:
   said step of impinging the material web by means of radiant heat in said at least one predetermined zone entails heating the material web over the width thereof with radiant heat of different temperature.

9. The method as defined in claim 1, wherein:
   said step of impinging the material web by means of radiant heat in said at least one predetermined zone entails heating the material web over the width thereof with radiant heat of three different temperatures.

10. The method as defined in claim 1, wherein:
    the radiation temperature of the radiant heat is at least 15° C. higher than the temperature of said preheated air.

11. The method as defined in claim 1, further including the step of:
    selecting as the material web a web impregnated with a thermosetting resin.

12. The method as defined in claim 11, wherein:
    said thermosetting resin is a thermosetting synthetic resin.

13. An apparatus for heat treating a material web selectively provided with a liquid having viscosity selected from low viscosity and high viscosity comprising:
    a treatment chamber through which the material web is guided;
    a first radiant heater arranged in said treatment chamber;
    at least one air inlet for hot air arranged in said treatment chamber;
    said at least one air inlet constituting at least one air nozzle;
    a second radiant heater arranged in said treatment chamber; the material web having a predetermined direction and a sinusoidal form of travel; and
    said at least two radiant heaters and said at least one air nozzle in said treatment chamber being consecutively arranged in said predetermined direction of travel of the material web.

14. The apparatus as defined in claim 13, wherein:
    said treatment chamber is substantially horizontally arranged.

15. The apparatus as defined in claim 14, wherein:
    said treatment chamber is constructed as a suspension drier having at least one radiant heater.

16. The apparatus as defined in claim 13, wherein:
    in said treatment chamber there are arranged, in said predetermined direction of travel of the material web, first of all said at least one air nozzle and downstream thereto said at least one radiant heater.

17. The apparatus as defined in claim 13, wherein:
    said at least one air nozzle constitutes an air-nozzle arrangement; and
    in said treatment chamber there are arranged, in said predetermined direction of travel of the material web, first of all said air-nozzle arrangement and downstream thereto said at least one radiant heater.

18. The apparatus as defined in claim 13, wherein:
    in said treatment chamber there are arranged, in said predetermined direction of travel of the material web, first of all said first radiant heater and downstream thereto said at least one air nozzle, and downstream thereto said second radiant heater.

19. The apparatus as defined in claim 13, wherein:
    said at least one air nozzle constitutes an air-nozzle arrangement; and in said treatment chamber there are arranged, in said predetermined direction travel of the material web, first of all said first radiant heater and downstream thereto said air-nozzle arrangement, and downstream thereto said second radiant heater.

20. The apparatus as defined in claim 13, wherein:

each of said radiant heaters constitutes a plurality of radiant heaters;

said at least one air nozzle constitutes a plurality of air nozzles; and in said treatment chamber there are alternately arranged, in said predetermined direction of travel of the material web, one air nozzle and at least one radiant heater.

21. The apparatus as defined in claim 13, wherein:

each of said radiant heaters constitutes a plurality of radiant heaters;

said at least one air nozzle constitutes a plurality of air-nozzle arrangements; and in said treatment chamber there are alternately arranged, in said predetermined direction of travel of the material web, two air-nozzle arrangement and at least one radiant heaters.

22. The apparatus as defined in claim 13, wherein:

said at least one air nozzle extends transversely with respect to said predetermined direction of travel of the material web.

23. The apparatus as defined in claim 21, wherein:

said air-nozzle arrangements extend transversely with respect to said predetermined direction of travel of the material web.

24. The apparatus as defined in claim 23, wherein:

said air nozzles provided in each one of said plurality of air-nozzle arrangements are alternately arranged above and below the material web, so that the material web within the respective air-nozzle arrangement is alternately subjected to blowing from above and from below with hot air directed substantially toward the material web.

25. The apparatus as defined in claim 13, wherein:

said radiant heater in one heating zone is arranged only at one side of the material web, so that the material web is only one-sidedly impinged with radiant heat.

26. The apparatus as defined in claim 13, wherein:

said radiant heater in one heating zone is arranged at each side of the material web, so that the material web is impinged on both sides thereof with radiant heat.

27. The apparatus as defined in claim 13, wherein:

at least one of said radiant heater comprises, transversely with respect to said predetermined direction of travel of the material web, a plurality of zones, the temperature of is being controllable independent of one another.

28. The apparatus as defined in claim 13, wherein:

at least one of said radiant heater comprises, transversely with respect to said predetermined direction of travel of the material web, three zones, the temperature of is being controllable independent of one another.

29. The apparatus as defined in claim 13, wherein:

radiant heater possesses a surface confronting the material web; and said surface is substantially smooth.

30. The apparatus as defined in claim 13, wherein:

the radiation temperature of at least one of said radiant heater is higher by at least 15° C. than the temperature of said hot air.

* * * * *